United States Patent [19]

Steinbach et al.

[11] 4,179,426
[45] Dec. 18, 1979

[54] STABLE ALKYLHYDRIDOPOLYSILOXANE EMULSIONS

[75] Inventors: Hans-Horst Steinbach, Bergisch-Gladbach; Karl Schnurrbusch, Leverkusen; Matthias Rieder, Cologne; Otto Weiden, Leverkusen, all of Fed. Rep. of Germany

[73] Assignee: Bayer Aktiengesellschaft, Leverkusen, Fed. Rep. of Germany

[21] Appl. No.: 866,965

[22] Filed: Jan. 4, 1978

[30] Foreign Application Priority Data

Jan. 18, 1977 [DE] Fed. Rep. of Germany ....... 2701724

[51] Int. Cl.² ............................................. C08L 83/04
[52] U.S. Cl. .............................. 260/29.2 M; 8/115.6;
 106/287.13; 106/287.14; 106/287.15;
 106/287.16; 525/474
[58] Field of Search ................... 260/29.2 M, 825;
 106/287.13, 287.14, 287.15, 287.16; 8/115.6

[56] References Cited

U.S. PATENT DOCUMENTS

| | | | |
|---|---|---|---|
| 3,442,664 | 5/1969 | Heine | 106/287.14 |
| 3,669,702 | 6/1972 | Rall et al. | 106/287.13 |
| 3,716,518 | 2/1973 | Pittman et al. | 260/29.2 M |
| 3,935,147 | 1/1976 | Godshalk et al. | 260/29.2 M |

FOREIGN PATENT DOCUMENTS

| | | | |
|---|---|---|---|
| 1037707 | 8/1958 | Fed. Rep. of Germany | 260/29.2 M |
| 1161419 | 1/1964 | Fed. Rep. of Germany | 260/29.2 M |
| 1565387 | 3/1969 | France | 260/29.2 M |

*Primary Examiner*—Allan Lieberman
*Attorney, Agent, or Firm*—Sprung, Felfe, Horn, Lynch & Kramer

[57] ABSTRACT

An aqueous alkylhydridopolysiloxane emulsion is stabilized against loss of hydrogen by addition thereto of about 0.1 to 5% by weight of an emulsifier containing perfluoroalkyl groups. The emulsion may further contain a fluoroalkyl-substituted siloxane of the formula

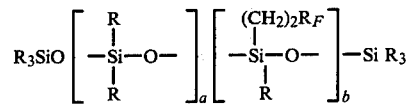

wherein
R each independently is alkyl with 1 to 6 carbon atoms or phenyl,
$R_F$ is fluoroalkyl with 4–12 carbon atoms,
a is about 5 to 70, and
b is about 5 to 70.

Advantageously the emulsifier is a member selected from the group consisting of a perfluoroalkyl ether of the formula

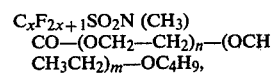

wherein
X=about 6–12,
n=2–about 40 and
m=2–about 40, and a perfluorinated alkane sulphonic acid salt of the formula

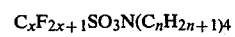

wherein
x=6–12 and
n=1–3.

5 Claims, No Drawings

STABLE ALKYLHYDRIDOPOLYSILOXANE EMULSIONS

The invention relates to improved aqueous emulsions of partially alkyl-substituted polysiloxanes, that is to say polysiloxanes containing Si-H bonds, with the aim of suppressing the known hydrolytic splitting off of hydrogen and increasing the stability of the emulsion.

Aqueous emulsions of organopolysiloxanes, which also contain alkylhydridopolysiloxanes, have found varied use for a relatively long time, in particular for impregnating fiber materials of all kinds, in which they are also often combined with crease-proofing agents. It is usual to impregnate textiles with them and then to heat the textiles in order to give them a water-repellent surface, the reactivity of the HSi group promoting the durability of the impregnation.

Because of the evolution of hydrogen and the demixing associated with this, this reactivity makes it difficult to store such emulsions and to transport them over relatively long routes. It is already known to reduce these disadvantages by adding a protective colloid, such as polyvinyl alcohol, and increasing the viscosity of the emulsions. Self-emulsifying solutions of the polysiloxanes, with which attempts are made to deal with the problem, are also known. However, such measures are frequently not satisfactory since they restrict the range of use, for example they impair the ease of combination with crease-proofing agents, and since the "liquors", that is to say the emulsions prepared at the place of application by high dilution with water, become unstable.

In order to improve the stability of the emulsion it has also already been proposed to add small amounts of carboxylic acids containing primary amino groups to the mixture to be emulsified (compare German Patent Specification No. 1,161,419). Furthermore, aldehyde or polyvinyl alcohol additives for stabilizing the Si-H bond have also been tested. However, although considerable improvements have been achieved, all of these additives could not contribute to a complete solution of the problem.

The present invention thus relates to stable, aqueous alkylhydridopolysiloxane emulsions, which are characterized in that they contain about 0.1 to 5% by weight (relative to the total amount of emulsion) of an emulsifier containing perfluoroalkyl groups, and optionally about 0.1 to 5% by weight (also relative to the total amount of emulsion) of an organopolysiloxane containing perfluoroalkyl groups.

It has been shown, surprisingly, that by adding emulsifiers containing perfluoroalkyl groups to polysiloxane emulsions of this type, a very good stabilization of the Si-H bond is achieved, coupled with simultaneous stability of the emulsion.

The siloxane oils to be emulsified, which in most cases are mixtures of customary diorganosiloxane polymers and alkylhydridopolysiloxanes, wherein the alkyl radical may have up to about 6 carbon atoms, such as, for example, methylhydridopolysiloxanes, to which organic solvents, such as, for example, toluene or bromobenzene, can also additionally be added, have viscosities between about 5 cP and 500 cP (20° C.). The proportions should be chosen so that the sum of the organopolysiloxanes is, in total, up to about 40% by weight of the storable emulsion.

Suitable emulsifiers containing perfluoroalkyl groups are, for example, perfluoroalkyl polyethers of the general formula

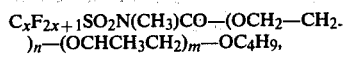

$C_xF_{2x+1}SO_2N(CH_3)CO-(OCH_2-CH_2-)_n-(OCHCH_3CH_2)_m-OC_4H_9$, wherein
X=about 6-12,
n=2-about 40 and
m=2-about 40.

Compounds wherein X=about 8, n=about 20-30 and m=about 20-30 are preferred. Longer-chain perfluorinated alkanesulphonic acid salts of the composition $C_xF_{2x+1}SO_3N(C_nH_{2n+1})_4$ (x=6-12, n=1-3), such as, for example, $C_8F_{17}SO_3N(C_2H_5)_4$, are also suitable.

In certain circumstances it can be appropriate also to additionally add fluoroalkyl-substituted siloxanes to the emulsions, e.g. about 0.1 to 5% by weight. These can favor the stability of the emulsion, in particular when emulsifiers having a slightly alkaline action, such as, for example, $C_8F_{17}SO_3K$ or $C_8F_{17}SO_3N(CH_3)_4$, are used. For this purpose, organopolysiloxanes, containing perfluoroalkyl groups, of the general formula

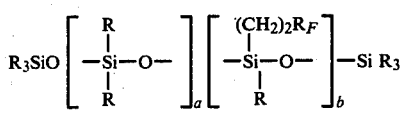

wherein
the R's independently of one another represent an alkyl radical with 1-6 C atoms or a phenyl radical,
$R_F$ represents a perfluoroalkyl radical with 4-12 C atoms,
a represents a number from about 5 to 70 and
b represents a number from about 5 to 70,
are suitable.

An example which should be mentioned of this type of substance is

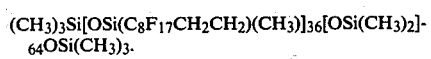

$(CH_3)_3Si[OSi(C_8F_{17}CH_2CH_2)(CH_3)]_{36}[OSi(CH_3)_2]_{64}OSi(CH_3)_3$.

The concentration, in the emulsion, of the emulsifier containing perfluoroalkyl groups should be about 0.1 to 5% by weight (relative to the total amount of emulsion), preferably about 0.2 to 1.5% by weight.

It is, of course, also possible to stabilize the emulsions mentioned with emulsifier mixtures or mixed emulsifiers. In this procedure, both fluorine-containing and fluorine-free mixtures of emulsifiers can be used, provided that the conditions according to the invention are observed.

The present invention is illustrated in still further detail in the following examples:

EXAMPLE 1

35 parts by weight of methylhydridopolysiloxane (viscosity 17 cSt at 20° C.) are added to a solution of 0.5 part by weight of $C_8F_{17}SO_2N(CH_3)CO(OC_2H_4)_{30}-(OC_3H_6)_{30}-OC_4H_9$ in 64.5 parts by weight of water and the entire mixture is emulsified in a homogenizing device ("Gann" machine). An extremely stable emulsion is obtained, which can be combined with zirconium soaps or used as a crosslinking agent, mixed with other organopolysiloxane emulsions.

When an emulsion (200 ml) prepared in the manner described was continuously stirred intensively for 24 hours at 40° C., only 2 cm³ of hydrogen were evolved. On standing undisturbed at room temperature still no gas could be observed after 4 days.

EXAMPLE 2

Twice the amount of a non-fluorinated polyoxyethylenealkyl ether having a HLB value of 11.4 ("Renex 36"—from Messrs. Atlas-Chemie GmbH, Essen) is added to the perfluoroalkyl polyether used as the emulsifier in Example 1 and the procedure followed is the same as described above. An emulsion is obtained, which is distinguished by a very good stability. No evolution of hydrogen could be detected either after stirring for 24 hours at 40° C. or in the alkaline range (pH 8). When used as an impregnating agent in the textile field, excellent effects can be achieved by the very good stability of the emulsion towards liquors and salts. The necessary reaction of the Si-H group begins only after the decomposition of the emulsion on the textile surface and, compared with a non-stabilized emulsion, thereby exhibits no disadvantages of any sort.

EXAMPLE 3

32 parts by weight of a methylhydridopolysiloxane oil and 3 parts by weight of a methyl-fluoroalkylpolysiloxane oil of the formula $(CH_3)_3Si[C_8F_{17}CH_2CH_2(CH_3)SiO]_{10.8}[Si(CH_3)_2O]_{17.2}$—$Si(CH_3)_3$ are mixed with one another. The viscosity of the oil mixture is 22 cSt. The mixture is added to a solution of 0.5 part by weight of the emulsifier from Example 1 in 64.5 parts by weight of water and is emulsified in a device customary for this purpose. Upon stirring this emulsion at 40° C., 3 cm³ of hydrogen (from 200 ml of emulsion) were evolved over a period of 24 hours.

It will be appreciated that the instant specification and examples are set forth by way of illustration and not limitation, and that various modifications and changes may be made without departing from the spirit and scope of the present invention.

What is claimed is:

1. In an aqueous alkylhydridopolysiloxane emulsion, the improvement which comprises about 0.1–5% by weight of the total amount of emulsion of an emulsifier containing perfluoroalkyl groups and selected from the group consisting of an ether of the formula

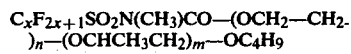

and an alkanesulphonic acid salt of the formula

wherein
 $x = 6-12$,
 $m = 2-40$,
 $n = 2-40$, and
 $p = 1-3$,
thereby stabilizing the emulsion against loss of hydrogen.

2. An emulsion according to claim 1, having a viscosity between about 5 and 500 cP at 20° C.

3. An emulsion according to claim 1, wherein the emulsion further contains a diorganosiloxane polymer and the total amount of diorganosiloxane polymer plus alkylhydridopolysiloxane is up to about 40% by weight of the emulsion.

4. An emulsion according to claim 1, wherein the emulsion further contains a fluoroalkyl-substituted siloxane of the formula

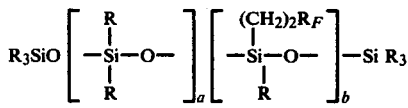

wherein
 R each independently is alkyl with 1 to 6 carbon atoms or phenyl,
 $R_F$ is fluoroalkyl with 4–12 carbon atoms,
 a is about 5 to 70, and
 b is about 5 to 70.

5. An emulsion according to claim 4, wherein the emulsion further contains a diorganosiloxane polymer and the total amount of diorganisiloxane polymer plus alkylhydridopolysiloxane is up to about 40% by weight of the emulsion, the emulsifier being present in about 0.2 to 1.5% by weight.

* * * * *